United States Patent
Yamaguchi et al.

(10) Patent No.: US 6,297,863 B1
(45) Date of Patent: Oct. 2, 2001

(54) REFLECTIVE LIQUID CRYSTAL DISPLAY DEVICE

(75) Inventors: Hisanori Yamaguchi; Tomoaki Sekime; Yoshio Iwai; Tetsu Ogawa, all of Ishikawa (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/136,773

(22) Filed: Aug. 19, 1998

(30) Foreign Application Priority Data

Aug. 25, 1997 (JP) .................................................. 9-227960

(51) Int. Cl.$^7$ ....................... G02F 1/1347; G02F 1/1335; G02F 1/13
(52) U.S. Cl. ............................... 349/76; 349/96; 349/112; 349/117; 349/181
(58) Field of Search .................... 349/76, 96, 112, 349/113, 117, 119, 181

(56) References Cited

U.S. PATENT DOCUMENTS

| | | |
|---|---|---|
| 4,019,808 | 4/1977 | Scheffer . |
| 4,088,400 | 5/1978 | Assouline et al. . |
| 4,973,137 | 11/1990 | Kozaki . |
| 4,984,872 | 1/1991 | Vick . |
| 5,132,830 | 7/1992 | Fukutani et al. . |
| 5,139,340 | 8/1992 | Okumura . |
| 5,175,638 | 12/1992 | Kanemoto et al. . |
| 5,408,344 | 4/1995 | Takigushi et al. . |
| 5,528,400 * | 6/1996 | Arakawa .................... 349/117 |
| 5,548,426 * | 8/1996 | Miyashita et al. ............ 349/117 |
| 5,585,950 | 12/1996 | Nishino et al. . |
| 5,587,821 | 12/1996 | Nakanishi et al. . |
| 5,619,356 | 4/1997 | Kozo et al. . |
| 5,629,784 | 5/1997 | Abileah et al. . |
| 5,684,551 | 11/1997 | Nakamura et al. . |
| 5,686,979 | 11/1997 | Weber et al. . |
| 5,793,455 * | 8/1998 | Nakamura .................... 349/96 |
| 5,796,455 | 8/1998 | Mizobata et al. . |
| 5,953,089 | 9/1999 | Hiji et al. . |
| 6,011,605 | 1/2000 | Mizuno et al. . |
| 6,115,095 * | 9/2000 | Suzuki et al. ................ 349/117 |

FOREIGN PATENT DOCUMENTS

| | | |
|---|---|---|
| 3-223715 | 10/1991 | (JP) . |
| 3-228016 | 10/1991 | (JP) . |
| 6-175125 | 6/1994 | (JP) . |
| 6-235931 | 8/1994 | (JP) . |
| 6301006 | 10/1994 | (JP) . |
| 6-308481 | 11/1994 | (JP) . |
| 7-84252 | 3/1995 | (JP) . |
| 407104272 | 4/1995 | (JP) . |
| 7-104272 | 4/1995 | (JP) . |
| 7-146469 | 6/1995 | (JP) . |
| 8-201802 | 8/1996 | (JP) . |

* cited by examiner

*Primary Examiner*—William L. Sikes
*Assistant Examiner*—Julie Ngo
(74) *Attorney, Agent, or Firm*—Merchant & Gould PC

(57) ABSTRACT

A reflective liquid crystal display device of the present invention has the following construction. Only one polarization film is needed. The twist angle of the nematic liquid crystal layer is set in the range of 0° to 90°. The product of the birefringence of the nematic liquid crystal layer $\Delta n_{LC}$ and the thickness of the liquid crystal layer $d_{LC}$, $\Delta n_{LC} \cdot d_{LC}$, is in the range of 0.35 $\mu$m to 0.50 $\mu$m. The birefringence difference, $\Delta R = R_{Film} - \Delta n_{LC} \cdot d_{LC}$ is in the range of −0.20 $\mu$m to 0.00 $\mu$m. When a reflective liquid crystal display device is seen from a side of a substrate positioned at the upper side, the direction of the liquid crystal which is twisted to a side of a substrate positioned at the lower side is designated as the positive direction, $\phi_{LC}$ represents an angle between the base line and the longer axis direction of the liquid crystal molecule which is positioned most closely to a first substrate, $\phi_F$ represents an angle between the base line and the retardation axis direction of the polymer film, $\phi_P$ represents an angle between the base line and the adsorption axis direction of the polarization film, $\phi_F - \phi_{LC}$ is in the range of 70° to 110° and $\phi_P - \phi_F$ is in the range of −90° to −60°.

38 Claims, 12 Drawing Sheets

REFLECTIVE LIQUID CRYSTAL DISPLAY DEVICE

FIELD OF THE INVENTION

The present invention relates to a reflective liquid crystal display device.

BACKGROUND OF THE INVENTION

A liquid crystal display device is thin and light, and therefore, has been widely used as a display for a personal digital assistant. A passive liquid crystal device which does not emit a light itself and expresses a display by changing the transmissivity and can be driven with several volts of effective voltage. Accordingly, when the liquid crystal display device is used as a reflective one which comprises a reflector provided at the lower side of the liquid crystal display device and expresses a display by reflecting the outside light, a display device with an extremely low consumption of electricity can be provided.

A conventional reflective color liquid crystal display device comprises basically a liquid crystal cell having a color filter and a pair of polarization films by which the liquid crystal cell is sandwiched. In this case, the color filter is provided on one of substrates of the liquid crystal cell, and a transparent electrode is formed on the color filter provided on the substrate of the liquid crystal cell. A voltage is applied to the liquid crystal cell to change the alignment of the liquid crystal molecules. Accordingly, the transmissivity of each color filter is changed so as to express a color display.

The transmissivity of one polarization film is 45% at most, as a whole. In this case, the transmissivity of a polarization component parallel to an adsorption axis of the polarization film is about 0% and the transmissivity of a polarization component perpendicular to the adsorption axis of the polarization film is about 90%. Accordingly, in a reflective liquid crystal display device comprising two polarization films, when the outside light is incident and reflected by a reflector and goes outside, the light passes through the polarization film four times. As a result, when adsorption by the color filter is not taken into account, the reflectance of the outside light is obtained by the following formula;

$$0.9^4 \times 50\% = 32.8\%$$

Accordingly, when the color filter of the conventional reflective color liquid crystal display device is removed and the device is used as a black and white panel, in the same way, the reflectance reaches 33% at most.

In order to brighten a light display, several reflective liquid crystal display devices comprising only one polarization film provided on the upper side of a liquid crystal cell that is sandwiched by the polarization film and a reflector have already been proposed (refer to Japanese Laid-Open Patent Publication No. 7-146469 and No. 7-84252). In these proposed reflective liquid crystal display devices, the light passes through the polarization film only twice. When adsorption by a color filter is not taken into account, the reflectance of the outside light is obtained by the following formula.

$$0.9^2 \times 50\% = 40.5\%$$

Therefore, these proposed reflective liquid crystal display devices can be expected to increase the reflectance by at most about 23.5% in comparison with that of the liquid crystal display device comprising two polarization films.

A reflective color liquid crystal display device in which a color display is expressed by using the birefringence of a twist orientation nematic liquid crystal layer and a polarization film, without using a color filter, has been disclosed in Japanese Laid-Open Patent Publication No.6-308481. A color liquid crystal display device in which the birefringence of liquid crystal and phase difference film is used has been disclosed in Japanese Laid-Open Patent Publication No.6-175125 and No.6-301006.

However, a reflective liquid crystal device comprising two polarization films can not have sufficient reflectance to obtain sufficient brightness when a color display is expressed by using the additional color filter.

Further, a reflective liquid crystal display device comprising one polarization film expresses a color display using a color filter and the brightness is maintained by increasing the reflectance. In the above-mentioned conventional constitution, it is difficult to express a black and white display in achromatic color, and it is especially difficult to express a black display in achromatic color with low reflectance.

In the reflective color liquid crystal display device in which a colored display is expressed by using the birefringence of twist alignment nematic liquid crystal layer and a polarization film, without using a color filter, or the color liquid crystal display device in which the birefringence of liquid crystal and phase difference film is used, since a color filter is not provided, the efficient reflectance to obtain the practical brightness can be ensured even if two polarization films are used. However, in the above-mentioned color liquid crystal display devices, since a color display is expressed by using the birefringence, on the principle, it is difficult to express a multi-grade and multi-color display such as a 16 grade 4096 color display or a 64 grade full-color display. Further, the above-mentioned color liquid crystal display devices have other problems such as the range of color purity and color reproduction is also being narrow.

In a reflective liquid crystal display device with black and white mode comprising two polarization films, a white display with high reflectance can't be obtained, either.

SUMMARY OF THE INVENTION

In order to solve the above-mentioned problems in the prior art, it is an object of the present invention to provide a reflective liquid crystal display device that can express a black and white display in achromatic color having a bright white display and a high contrast display.

To accomplish the above-mentioned object, one embodiment of a reflective liquid crystal display device according to the present invention comprises a liquid crystal cell including a first substrate, a second substrate and a nematic liquid crystal layer, the nematic liquid crystal layer being sealed between the first substrate and the second substrate, a polarization film provided at a first substrate side of the liquid crystal cell, a polymer film provided between the polarization film and the liquid crystal cell, and a light reflector provided at a second substrate side of the liquid crystal cell. The twist angle of nematic liquid crystals in the nematic liquid crystal layer between a pair of the first and second substrates is in the range of 0° to 90°. The product of the birefringence of the nematic liquid crystal layer $\Delta n_{LC}$ and the thickness of the liquid crystal layer $d_{LC}$, $\Delta n_{LC} \cdot d_{LC}$, is in the range of 0.35 $\mu$m to 0.50 $\mu$m.

The birefringence difference $\Delta R$ is in the range of −0.20 $\mu$m to 0.00 $\mu$g m, wherein $\Delta R = R_{film} - \Delta n_{LC} \cdot d_{LC}$ and $R_{Film}$ is the retardation of the polymer film. When the reflective liquid crystal display device is seen from the first substrate side, the direction of the liquid crystal which is twisted from the first substrate side to the second substrate side is designated as the positive direction, $\phi_{LC}$ represents an angle between a base line which is set in the in-plane direction of the substrate and the longer axis direction of a liquid crystal molecule which is positioned most closely to the first substrate, $\phi_F$ represents an angle between the base line and the retardation axis direction of the polymer film, $\phi_P$ represents an angle between the base line and the adsorption axis direction of the polarization film, $\phi_F-\phi_{LC}$ is in the range of 70° to 110° and $\phi_P-\phi_F$ is in the range of −90° to −60°.

According to the above-mentioned liquid crystal device, a normally white reflective liquid crystal display device that can express the change of black and white in achromatic color, and a bright display, can be provided.

To accomplish the above-mentioned object, another embodiment of a reflective liquid crystal display device according to the present invention comprises a liquid crystal cell including a first substrate, a second substrate and a nematic liquid crystal layer, the nematic liquid crystal layer being sealed between the first substrate and the second substrate, a polarization film provided at a first substrate side of the liquid crystal cell, a polymer film provided between the polarization film and the liquid crystal cell, and a light reflector provided at a second substrate side of the liquid crystal cell. A twist angle of nematic liquid crystals in the nematic liquid crystal layer between a pair of the first and second substrates is in the range of 0° to 90°. The product of the birefringence of the nematic liquid crystal layer $\Delta n_{LC}$ and the thickness of the liquid crystal layer $d_{LC}$, $\Delta n_{LC} \cdot d_{LC}$, is in the range of 0.35 μm to 0.50 μm.

The birefringence difference $\Delta R$ is in the range of −0.20 μm to 0.00 μm, wherein $\Delta R = R_{Film} - \Delta n_{LC} \cdot d_{LC}$ and $R_{Film}$, is the retardation of the polymer film. When the reflective liquid crystal display device is seen from the first substrate side, the direction of the liquid crystal which is twisted from the first substrate side to the second substrate side is designated as the positive direction, $\phi_{LC}$ represents an angle between a base line which is set in the in-plane direction of the substrate and the longer axis direction of a liquid crystal molecule which is positioned most closely to the first substrate, $\phi_F$ represents an angle between the base line and the retardation axis direction of the polymer film, $\phi_P$ represents an angle between the base line and the adsorption axis direction of the polarization film, $\phi_F-\phi_{LC}$ is in the range of 70° to 110° and $\phi_P-\phi_F$ is in the range of −55° to −25°.

According to the above-mentioned liquid crystal display, a normally black reflective liquid crystal display device that can express the change of black and white in achromatic color, and a bright display, can be provided.

$R_{Film}$, the retardation of a polymer film is expressed by the following formula $R_{Film} = (n_x - n_y) \cdot d_{Film}$, wherein $n_x$ represents the extraordinary index of refraction of the inside of each polymer film, ny represents the ordinary index of refraction of the inside of each polymer film, and $d_{Film}$ represents the thickness of each polymer film.

DETAILED DESCRIPTION OF THE INVENTION

Figure 1:
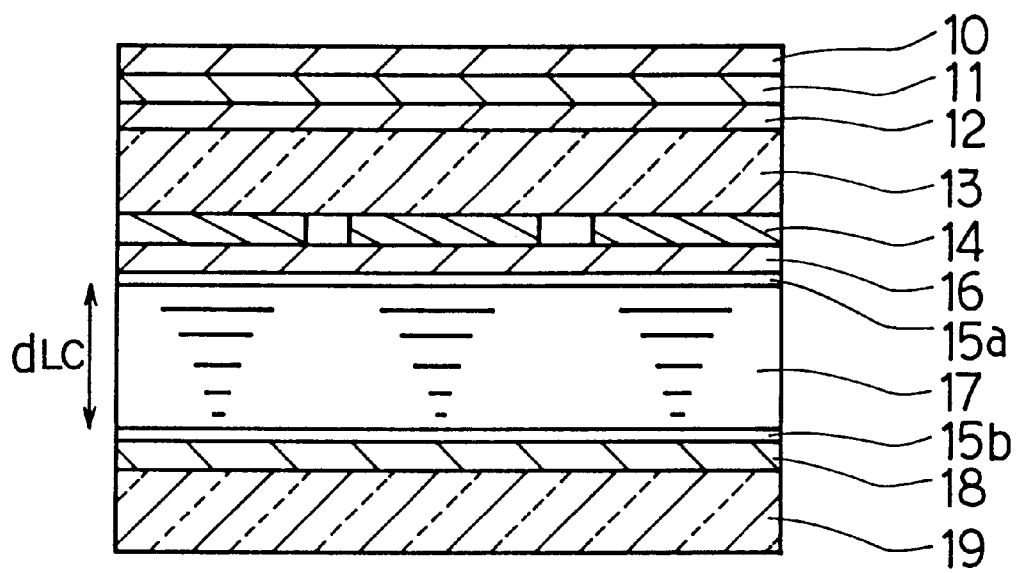
FIG. 1 is a sectional view showing one example of the reflective liquid crystal display device of the present invention.

In the reflective liquid crystal display device of this invention, it is preferable that the twist angle of nematic liquid crystals in the nematic crystal layer is in the range of 30° to 60°, and the $\Delta n_{LC} \cdot d_{LC}$ is in the range of 0.35 μm to 0.45 μm. According to the preferable example, a more preferable property can be obtained.

In a normally white reflective liquid display device, it is preferable that the $R_{Film}$ is in the range of 0.25 μm to 0.45 μm (in the range of 0.35 μm±0.10 μm). According to the preferable example, the reflectance of black when an on-voltage is applied can be further reduced. On the other hand, in a normally black reflective liquid display device, it is preferable that $R_{Film}$ is set in the range of 0.20 μm to 0.40 μm (in the range of 0.30 μm±0.10 μm). According to the preferable example, the reflectance of black when an off-voltage is applied can be further reduced.

In the reflective liquid crystal display device, it is preferable that the polymer film includes at least one polymer selected from polycarbonate, polyalylate and polysulfone. According to the preferable example, a black display with sufficiently low reflectance in achromatic color and a white display with sufficiently high reflectance in achromatic color can be obtained. As a result, a reflective liquid crystal display device with high contrast display can be provided.

In the reflective liquid crystal display device, it is preferable that $Q_Z$, the coefficient of Z of the polymer film is in the range of 0.0 to 1.0. $Q_Z$ is the coefficient obtained by the following formula; $Q_Z = (n_x - n_z)/(n_x - n_y)$. In the formula, $n_x$ represents the refraction index of X axis, the retardation axis direction (the extraordinary index of refraction), $n_y$ represents the refraction index of Y axis, the procession axis direction (the ordinary index of refraction) and Z axis represents the normal direction to the film surface of a spatial axis of direction (x, y, z). According to the preferable example, a reflective liquid display device which has a small change of the reflectance caused by a change of a visual angle can be provided. It is further preferable that $Q_Z$ is set in the range of 0.2 to 0.6.

In the reflective liquid crystal display device, it is preferable that a light scattering film is provided at the first substrate side and the light scattering film is a forward light scattering film. It is preferable that the forward light scattering film hardly scatters light beams backward, that is, reflected light is hardly scattered, and has a strong tendency to scatter light beams forward. It is preferable that the forward light scattering is 60% or higher of haze ratio, that is shown by the following formula; (scattering light transmissivity)/(total light transmissivity)×100[%].

It is preferable that a forward light scattering film has the directivity of light scattering property and scatters only the incident light from the predetermined range. For example, it is preferable that the film has a light scattering range set by $\theta(\times 90° \leq \theta \leq 90°)$, wherein the $\theta$ is an angle between a factor determined by projecting an incident light on the flat surface containing a normal of the film, and the normal of the film. Further, it is preferable that the light scattering range is asymmetric with respect to the normal of the film, because outside light can be collected efficiently and the reflectance property of front surface and the contrast property can be improved.

It is preferable that a light scattering film is provided between the liquid crystal cell and the polymer film, between the polymer film and the liquid crystal cell, or outside of the polarization film.

One light scattering film may be used. However, a plurality of layered light scattering films also may be used. When a plurality of light scattering films are used, it is preferable that light scattering films are layered not to have the same light scattering direction. That is, it is preferable that more than two light scattering films which have the light scattering range, $0° \leq \theta \leq 90°$ are layered so that factors determined by projecting a bisector of the light scattering range on the surface of the forward light scattering film do not have same direction (hereinafter, the projected direction is sometimes referred to as "light scattering direction"). According to the preferable example, a natural visual property can be obtained. Particularly, it is preferable that two, three or four forward light scattering films are layered to have an orthogonal angle or an anti-parallel direction. According to the preferable example, a natural visual property can be obtained for more visual directions.

In the reflective liquid crystal display device, it is preferable that the light reflector is a metal electrode, and the metal electrode includes at least one metal selected from aluminum and silver. Further, it is preferable that the light reflector is a metal electrode provided at the second substrate side.

When a liquid crystal display device comprises the light scattering film, it is preferable that the metal electrode has a specular surface. According to the preferable example, the alignment direction of the liquid crystals has a low level of disorder, and as a result, a natural visibility can be obtained. On the other hand, it is also preferable that a light scattering film is provided on the metal electrode or the diffused reflection property is applied to the metal electrode. It is preferable that the metal electrode has an uneven surface, the average incline angle being in the range of 3° to 12°.

According to the preferable example, a reflective liquid crystal display device having a natural visual property can be realized.

The second substrate of the reflective liquid crystal display device may be a transparent substrate. Further, the reflective liquid crystal display device may comprise a light reflector such as a diffusing reflector provided outside of the transparent substrate. In this case, a transparent electrode provided at a second substrate side is used as an electrode. In this case, it is preferable that an air layer is provided between the transparent substrate and the light reflector. According to the preferable example, the diffusion effect can be further increased.

A color reflective liquid crystal display device may be manufactured by providing a color filter in the reflective liquid crystal display device. A reflective liquid crystal display device with a black and white mode may be manufactured by not providing a color filter in the reflective liquid crystal display device. In the latter case, a reflective liquid crystal display device having a bright display due to the high reflectance of a white display can be realized. In the former case, a reflective liquid crystal display device which can express a full-color display such as 64 grades due to the property to change the display from white to black in achromatic color can be realized.

An active matrix reflective liquid crystal display device driven by a non-linear element such as TFT (thin film transistor) positioned in a matrix at the second substrate side can be realized by providing the non-linear element at the second substrate side of the reflective liquid crystal display device. In this case, it is preferable that an insulating film for flattening is formed on the non-linear element and a contact hole formed in the film for flattening provides an electrical contact with the non-linear element and an electrode provided at the second substrate side. According to the preferable example, a high-quality reflective liquid crystal display device that has a high opening ratio and can be driven actively can be realized.

Hereinafter, the details of the present invention will be described referring to the drawings.

(A First Embodiment)

FIG. 1 is a sectional view showing one example of a reflective liquid crystal display device of a first embodiment of the present invention. In FIG. 1, numeral 10 represents a polarization film, numeral 11 represents a polymer film, numeral 12 represents a light scattering film layer, numeral 13 represents a transparent substrate positioned at the upper side, numeral 14 represents a color filter layer, numeral 15a and 15b represent an alignment layer, numeral 16 represents a transparent electrode, numeral 17 represents a liquid crystal layer (having a thickness of $d_{LC}$), numeral 18 represents a metal reflective electrode and numeral 19 represents a substrate positioned at the lower side.

Figure 2:
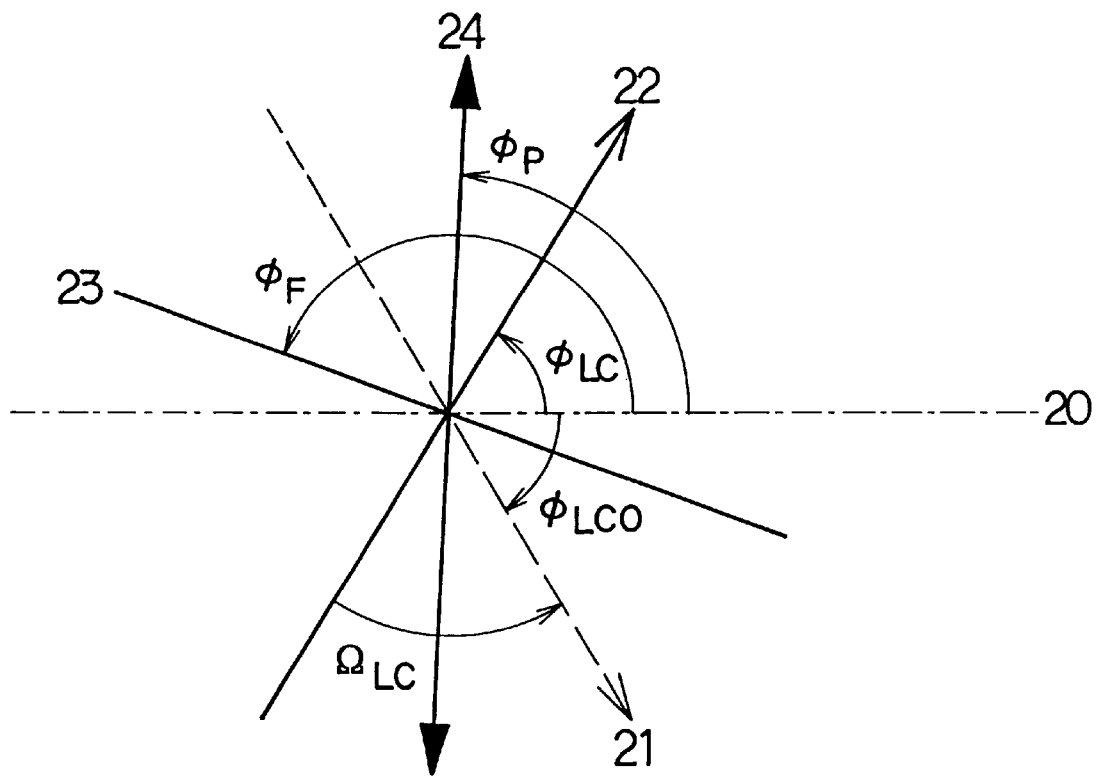
FIG. 2 illustrates the combination of optical factors in the reflective liquid crystal display device of the present invention.

FIG. 2 is illustrates the optical factors of each element in the reflective liquid crystal display device as shown in FIG. 1, seen from the upper side. In FIG. 2, numeral 20 represents a base line on the surface of the film, numeral 21 represents the alignment direction of a liquid crystal molecule which is positioned most closely to a substrate positioned at the lower side, numeral 22 represents the alignment direction of a liquid crystal molecule which is positioned most closely to a transparent substrate positioned at the upper side, numeral 23 represents the retardation axis direction of a polymer film, numeral 24 represents the adsorption axis direction of a polarization film positioned at the upper side, $\phi_{LCO}$, $\phi_{LC}$, $\phi_F$ and $\phi_P$ represent angles measured from the base line 20 to the alignment direction 21 of a liquid crystal molecule which is positioned most closely to a substrate 19 positioned at the lower side, the alignment direction 22 of a liquid crystal molecule which is positioned most closely to a transparent substrate 13 positioned at the upper side, the retardation axis direction 23 of a polymer film 11, and the adsorption axis direction 24 of a polarization film 10, respectively. The twist direction of liquid crystals indicated by $\Omega_{LC}$ (the direction of liquid crystal molecules which are twisted from a side of the transparent substrate positioned at the upper side to a side of the substrate positioned at the lower side) is set to be positive.

A non-alkali glass substrate (for example, 1737: manufactured by Corning Co., Ltd.) was used as a transparent substrate 13 and a substrate 19. A color pigment dispersion filter layer 14 with stripe-array of red, green and blue was provided by photolithography on the transparent substrate 13. A transparent electrode 16 composed of an oxide of indium and tin (ITO) as a picture element electrode was provided on the surface of the color filter layer 14. A specular reflective metal reflective electrode 18 was provided on the substrate 19 at the lower side by depositing a titanium film having a thickness of 300 nm and an aluminum film having a thickness of 200 nm in that sequential order.

5 wt % polyimide solution (the solvent is γ-butyrolactone) was printed on a transparent electrode 16 and a metal reflective electrode 18. Then the polyimide solution was hardened at 200° C. and an alignment treatment was carried out by the rotation rubbing method using rayon cloth to obtain a predetermined twist angle. Accordingly, alignment layers 15a and 15b were provided on the transparent electrode 16 and the metal reflective electrode 18, respectively.

Next, a thermo-setting seal resin containing 1.0 wt % of glass fiber having a predetermined diameter (for example, Struct Bond manufactured by Mitsui Toatsu Chemicals, Inc.) was printed on the periphery of the surface of the transparent substrate 13 positioned at the upper side and resin beads having a predetermined diameter were spread on the substrate 19 positioned at the lower side at a ratio of 100–200 pieces/mm². The transparent substrate 13 and the substrate 19 were adhered together, and then the thermosetting seal resin was hardened at 150° C. Next, air in the cell container was evacuated. Then, the liquid crystal, which was obtained by mixing a predetermined amount of chiral crystal with fluorine-containing ester based nematic liquid crystal layer having the birefringence $\Delta n_{LC}$=0.09 was filled in the cell container. Then, the filled portion of the cell container was sealed with ultraviolet ray hardening resin, and the ultraviolet ray hardening resin was hardened by irradiation with ultraviolet ray to manufacture a liquid crystal cell.

A forward light scattering film with the light scattering range of 0° to 50° measured from the normal of the film (Lumisty: manufactured by SUMITOMO CHEMICAL CO., Ltd.) was adhered as a light scattering film 12 to the surface of the transparent substrate 13 of the liquid crystal cell, so that a factor determined by projecting a bisector of the light scattering range on the surface of the forward light scattering film flight scattering direction) and a base line 20 have an orthogonal angle. A polycarbonate as a polymer film 11 is adhered to the light scattering film 12 so as to obtain a predetermined angle for the retardation axis direction. Finally, a neutral gray polarization film (SQ-1852AP: manufactured by SUMITOMO CHEMICAL CO., Ltd.) as a polarization film 10, to which anti-reflection (AR) treatment was applied, was adhered to the polymer film 11 so as to obtain a predetermined angle for the adsorption axis direction.

The values of the reflective liquid crystal display device are set as follows. $\phi_{LCO}$=−67.5°, $\phi_{LC}$=67.5°, $\Omega_{LC}$=45.0°, $\phi_F$=157.5° and $\phi_P$=87.5°.

When the optical property of the reflective liquid crystal display device was measured while $\Delta n_{LC} \cdot d_{LC}$ was changed so that $\Delta R = R_{Film} - \Delta n_{LC} \cdot d_{LC}$ satisfied −0.10 μm, it was confirmed that a reflective liquid crystal display device with normally white mode, which can express a black display in achromatic color with low reflectance and a white display in achromatic color with high reflectance when $\Delta n_{LC} \cdot d_{LC}$ is in the range of 0.35 μm to 0.50 μm, was realized. That is, under the above-mentioned condition, a liquid crystal has enough birefringence difference to express a black display and a white display distinctly and coloring caused by the birefringence of the liquid crystal can be compensated.

When the birefringence difference, $\Delta R$, satisfies the range of −0.20 μm to 0.00 μm, and a voltage is applied to change a display from white to black display, it was confirmed that the color of the display was changed in the range of achromatic color in practice. That is, when the birefringence difference, $\Delta R$, is in the range of −0.20 μm to 0.00 μm and $\phi_F - \phi_{LC}$ is 90°±20°, coloring caused by the birefringence of the liquid crystal layer can be prevented during the change of the display from white to black, especially when the display is black to which an on-voltage is applied. Accordingly, a reflective liquid crystal display device that expresses a black display in achromatic color with low reflectance and a white display in achromatic color with high reflectance, that is a high contrast, can be realized.

Next, the optical property of the reflective liquid crystal display device was measured while a twist angle of a liquid crystal, $\Omega_{LC}$, was changed. In the first embodiment of this invention, it was confirmed that the preferable property can be obtained when the twist angle of the liquid crystal is in the range of 0° to 90°. It was further confirmed that the more preferable property can be obtained when the twist angle is in the range of 30° to 60° and $\Delta n_{LC} \cdot d_{Lc}$ is in the range of 0.35 μm to 0.45 μm.

It was also confirmed that when $R_{Film}$, satisfies the range of 0.25 μm to 0.45 μm, the reflectance of black, when an on-voltage is applied, can be decreased especially.

The values of the reflective liquid crystal display device are set as follows. $\Delta n_{LC} \cdot d_{LC}$=0.400 μm, $R_{Film}$=0.350 μm, $\phi_{LCO}$=−67.5, $\phi_{LC}$=67.5°, $\Omega_{LC}$=45.0°, $\phi_F$=155.0°, and $\phi_P$=76.5°. Under the above-mentioned condition, the optical property of the reflective crystal display device was measured. It was confirmed that $\Delta R = R_{Film} - \Delta n_{LC} \cdot d_{LC}$=−0.050 μm, $\phi_F - \phi_{LC}$=87.5° and $\phi_P - \phi_F$=−78.5°, that is, the above-mentioned condition was satisfied.

Figure 3:
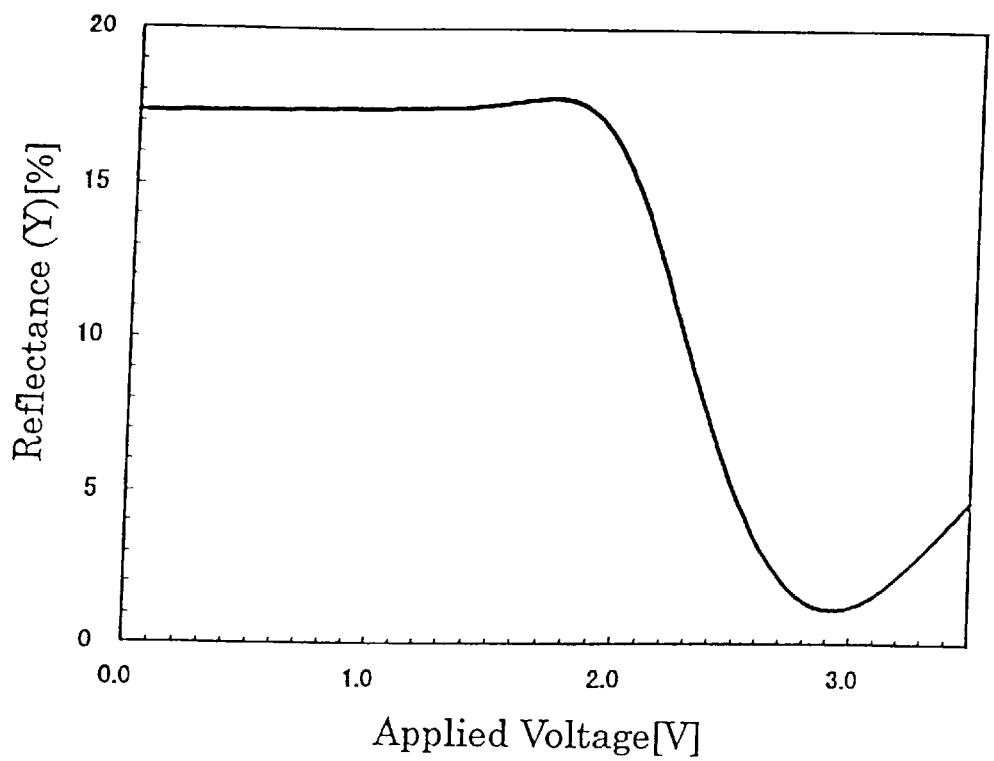
FIG. 3 shows one example of the relationship between the reflectance of the reflective liquid crystal display device of the present invention and the applied voltage.

FIG. 3 is a figure showing the relationship between the reflectance of the reflective liquid crystal display device and the applied voltage. The property of the front surface of the reflective liquid crystal display device was measured. The reflectance of white with Y value conversion was 17.8% and the contrast was 15.4. It was also confirmed that a 64 grade full-color display can be expressed since the color is changed from black to white in achromatic color.

Further, a reflective liquid crystal display device with a black and white mode was manufactured by removing a color filter layer 14 and the property of the front surface was measured. The contrast was 15.1 and the reflectance of white with Y value conversion was 33.9%.

According to the above-mentioned constitution, the light scattering film layer 12 was provided between the polymer film 11 and the transparent substrate 13. However, the same property can be obtained when the light scattering film layer 12 was provided on the polarization film 10 and that was provided between the polarization film 11 and the polymer film 12.

Further, it was confirmed that the same effect can be obtained by using, for example, polyalylate or polysulfone as a polymer film, although polycarbonate was used in the present embodiment.

Further, it was confirmed that the same effect can be obtained by using a metal reflective electrode comprising silver, although the metal reflective electrode comprising aluminum was used in the present invention.

(A Second Embodiment)

Figure 4:
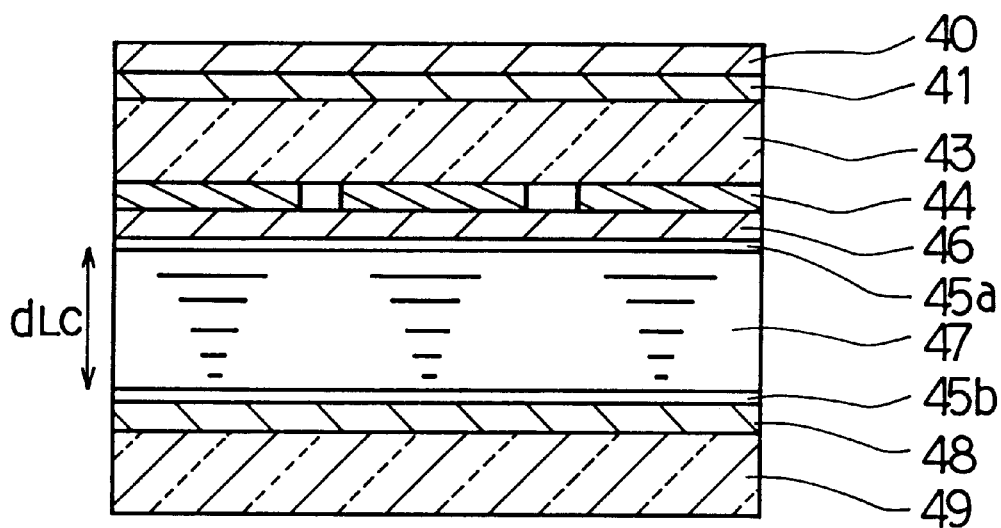
FIG. 4 is a sectional view showing another example of the reflective liquid crystal display device of the present invention.

FIG.4 is a sectional view showing a reflective liquid crystal display device of a second embodiment of the present invention. In FIG.4, numeral 40 represents a polarization film, numeral 41 represents a polymer film, numeral 43 represents a transparent substrate positioned at the upper side, numeral 44 represents a color filter layer, numeral 45a and 45b represent an alignment layer, numeral 46 represents a transparent electrode, numeral 47 represents a liquid crystal layer, numeral 48 represents a metal reflective electrode and numeral 49 represents a substrate positioned at the lower side.

The optical property in the second embodiment is the same as that in the first embodiment, that of the reflective liquid crystal display device as shown in FIG. 2.

A non-alkali glass substrate (for example, 1737: manufactured by Corning Co., Ltd.) was used as a transparent substrate 43 and a substrate 49. A pigment dispersion color filter layer 44 with stripe-array of red, green and blue was provided by photolithography on the transparent substrate 43. A transparent electrode 46 composed of an oxide of indium and tin was provided as a picture element electrode on the surface of the color filter layer 44. A diffusion (scattering) reflective metal reflective electrode 48 was provided on the substrate 49 at the lower side by depositing a titanium film having a thickness of 300 nm and an aluminum film having a thickness of 200 nm in that sequential order and roughening the surface to obtain the average incline angle in the range of 8° to 10°.

5 wt % polyimide solution (the solvent is γ-butyrolactone) was printed on a transparent electrode 46 and a metal reflective electrode 48. Then the polyimide solution was hardened at 200° C. and alignment treatment was carried out by the rotation rubbing method using rayon cloth to obtain a predetermined twist angle. Accordingly, alignment layers 45a and 45b were provided on the transparent electrode 46 and the metal reflective electrode 48, respectively.

Next, a thermo-setting seal resin containing 1.0 wt % of glass fiber having a predetermined diameter (for example, Struct Bond manufactured by Mitsui Toatsu Chemicals, Inc.) was printed on the periphery of the surface of the transparent substrate 43 positioned at the upper side and resin beads having a predetermined diameter were spread on the substrate 49 positioned at the lower side at a ratio of 100–200 pieces/mm$^2$. The transparent substrate 43 and the substrate 49 were adhered together, and then the thermo-setting seal resin was hardened at 150° C. Next, air in the cell container was evacuated. Then, the liquid crystal, which was obtained by mixing a predetermined amount of chiral crystal with fluorine-containing ester based nematic liquid crystal layer having the birefringence $\Delta n_{LC}$=0.09, was filled in the cell container. Then, the filled portion of the cell container was sealed with ultraviolet ray hardening resin, and the ultraviolet ray hardening resin was hardened by irradiating with ultraviolet ray to manufacture a liquid crystal cell.

A polycarbonate as a polymer film 41 was adhered to the surface of the transparent substrate 43 of the liquid crystal cell. Finally, a neutral gray polarization film (SQ-1852AP manufactured by SUMITOMO CHEMICAL CO., Ltd.) as a polarization film 40, to which anti-reflection (AR) treatment was applied, was adhered to a polymer film 41 so as to obtain a predetermined angle of the adsorption axis direction or that of the transmission direction.

The values of the reflective liquid crystal display device are set as follows. $\phi_{LCO}$=−67.5°, $\phi_{LC}$=67.5°, $\Omega_{LC}$=45.0°, $\phi_F$=157.5° and $\phi_P$=87.5°.

When the optical property of the reflective liquid crystal display device with reflective mode was measured while $\Delta n_{LC} \cdot d_{LC}$ was changed so that $\Delta R = R_{Film} - \Delta n_{LC} \cdot d_{LC}$ satisfied −0.10 μm, it was confirmed that a reflective liquid crystal display device with normally white mode, which can express a black display in achromatic color with low reflectance and a white display in achromatic color with high reflectance when $\Delta n_{LC} \cdot d_{LC}$ is in the range of 0.35 μm to 0.50 μm, was realized. That is, under the above-mentioned condition, the liquid crystal has enough birefringence difference to express a black display and a white display distinctly and coloring caused by the birefringence of the liquid crystal can be compensated.

When the birefringence difference, $\Delta R$, satisfies the range of −0.20 μm to 0.00 μm, and a voltage is applied to change a display from white to black, it was confirmed that the color of the display was changed in the range of achromatic color in practice. That is, when the birefringence difference, $\Delta R$, is in the range of −0.20 μm to 0.00 μm, and $\phi_F - \phi_{LC}$ is 90°±20°, coloring caused by the birefringence of the liquid crystal layer can be prevented during the change of the display from white to black, especially when the display is black to which an on-voltage is applied. Accordingly, a reflective liquid crystal display device that expresses a black display in achromatic color with low reflectance and a white display in achromatic color with high reflectance, that is a high contrast, can be realized.

Next, the optical property of the reflective liquid crystal display device was measured while a twist angle of a liquid crystal, $\Omega_{LC}$, was changed. In the second embodiment of this invention, it was confirmed that the preferable property can be obtained when the twist angle is in the range of 0° to 90°. It was confirmed that the more preferable property can obtained when the twist angle is in the range of 30° to 60° and $\Delta n_{LC} \cdot d_{LC}$ is in the range of 0.35 μm to 0.45 μm.

It was also confirmed that when $R_{Film}$ satisfies the range of 0.25 μm to 0.45 μm, the reflectance of black, when an on-voltage is applied, can be decreased, especially.

The values of the reflective liquid crystal display device are set as follows. $\Delta n_{LC} \cdot d_{LC}$=0.400 μm, $R_{Film}$=0.350 μm, $\phi_{LCO}$=−67.5°, $\phi_{LC}$=67.5°, $\Omega_{LC}$=45.0°, $\phi_F$=155.0°, and $\phi_P$=76.5°. Under the above-mentioned condition, the optical property of the reflective crystal display device was measured. It was confirmed that $\Delta R = R_{Film} - \Delta n_{LC} \cdot d_{LC}$=−0.050 μm, $\phi_F - \phi_{LC}$=87.5° and $\phi_P - \phi_F$=−78.5°, that is, the above-mentioned condition was satisfied.

The property of the front surface of the reflective liquid crystal display device was measured. The reflectance of white with Y value conversion was 16.5% and the contrast was 15.2. It was also confirmed that a 64 grade full-color display can be expressed since the color is changed from black to white in achromatic color.

Further, a reflective liquid crystal display device with a black and white mode was manufactured by removing a color filter layer 14 and the property of the front surface was measured. The contrast was 15.0 and the reflectance of white with Y value conversion was 32.7%.

Further, it was confirmed that the same effect can be obtained by using, for example, polyalylate or polysulfone as a polymer film, although polycarbonate was used in the present invention.

Further, in the present embodiment, the metal reflective electrode comprising aluminum was used. However, a metal reflective electrode comprising silver can obtain the same effect as that was obtained in the present embodiment.

(A Third Embodiment)

A method of manufacturing and the constitution of reflective liquid crystal display device in a third embodiment are in common substantially with those in the first embodiment. The reflective liquid crystal display device has the same optical property as that shown in the sectional figure of the reflective liquid crystal device, FIG. 1 and FIG. 2.

The values of the reflective liquid crystal display device are set as follows. $\phi_{LCO}=-67.5°$, $\phi_{LC}=67.5°$, $\Omega_{LC}=45.0°$, $\phi_F=157.5°$ and $\phi_P=112.5°$.

When the optical property of the reflective liquid crystal display device with reflective mode was measured while $\Delta n_{LC} \cdot d_{LC}$ was changed so that $\Delta R = R_{Film} - \Delta n_{LC} \cdot d_{LC}$ satisfied $-0.10 \mu m$, it was confirmed that a reflective liquid crystal display device with normally black mode, which can express a black display in achromatic color with low reflectance and a white display in achromatic color with high reflectance when $\Delta n_{LC} \cdot d_{LC}$ is in the range of $0.35 \mu m$ to $0.50 \mu m$, was realized. That is, under the above-mentioned condition, a liquid crystal has enough birefringence difference to express a black display and a white display distinctly and coloring caused by the birefringence of the liquid crystal can be compensated.

When the birefringence difference, $\Delta R$, satisfies the range of $-0.20 \mu m$ to $0.00 \mu m$, and a voltage is applied to change a display from black to white, it was confirmed that the color of the display was changed in the range of achromatic color in practice. That is, when the birefringence difference, $\Delta R$, is in the range of $-0.20 \mu m$ to $0.00 \mu m$, $\phi_F - \phi_{LC}$ is $90°\pm20°$, and coloring caused by the birefringence of the liquid crystal layer can be prevented during the change of the display from white to black, especially when the display is black to which an on-voltage is applied. Accordingly, a reflective liquid crystal display device that expresses a black display in achromatic color with low reflectance and a white display in achromatic color with high reflectance, that is a high contrast, can be realized.

Next, the optical property of the reflective liquid crystal display device was measured while a twist angle of a liquid crystal, $\Omega_{LC}$, was changed. In the third embodiment of this invention, it was confirmed that the preferable property can be obtained when the twist angle is in the range of 0° to 90°. It was further confirmed that the more preferable property can be obtained when the twist angle is in the range of 30° to 60° and $\Delta n_{LC} \cdot d_{LC}$ is in the range of $0.35 \mu m$ to $0.45 \mu m$.

It was confirmed that when $R_{Film}$ satisfies the range of $0.20 \mu m$ to $0.40 \mu m$, the reflectance of black, when an on-voltage is applied, can be decreased well.

The values of the reflective liquid crystal display device are set as follows. $\Delta n_{LC} \cdot d_{LC}=0.400 \mu m$, $R_{Film}=0.280 \mu m$, $\phi_{LCO}=-67.5°$, $\phi_{LC}=67.5°$, $\Omega_{LC}=45.0°$, $\phi_F=145.5°$, and $\phi_P=102.0°$. Under the above-mentioned condition, the optical property of the reflective crystal display device was measured. It was confirmed that $\Delta R = R_{Film} - \Delta n_{LC} \cdot d_{LC}=-0.120 \mu m$, $\phi_F - \phi_{LC}=78.0°$ and $\phi_P - \phi_F=-43.5°$, that is, the above-mentioned condition was satisfied.

Figure 5:
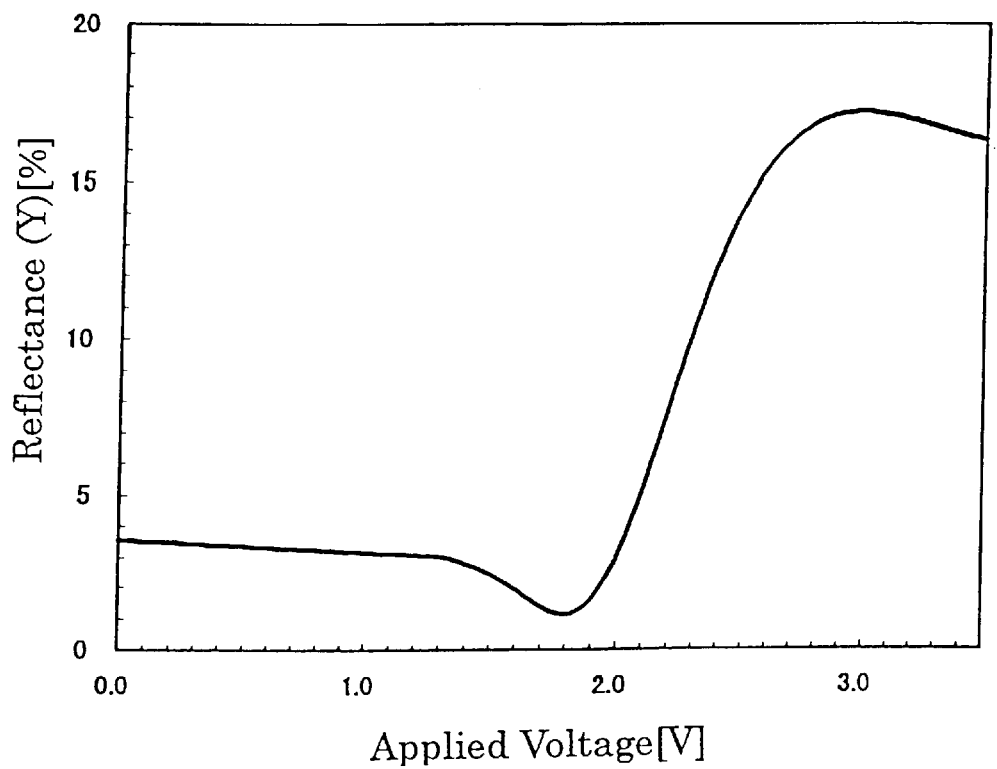
FIG. 5 shows another example of the relationship between the reflectance of the reflective liquid crystal display device of the present invention and the applied voltage.

FIG. 5 shows the relationship between the reflectance of the reflective liquid crystal display device in the third embodiment and the applied voltage. The property of the front surface of the reflective liquid crystal display device was measured. The reflectance of white with Y value conversion was 17.2% and the contrast was 15.1. It was also confirmed that a 64 grade full-color display can be expressed since the color is changed from black to white in achromatic color.

Further, a reflective liquid crystal display device with a black and white mode was manufactured by removing a color filter layer 44 and the property of the front surface was measured. The contrast was 15.0 and the reflectance of white with Y value conversion was 33.4%.

Further, it was confirmed that the same effect can be obtained by using, for example, polyalylate or polysulfone as a polymer film, although polycarbonate was used in the present invention.

Further, in the present embodiment, the metal reflective electrode comprising aluminum was used. However, a metal reflective electrode comprising silver can obtain the same effect as that obtained in the present embodiment.

(A Fourth Embodiment)

A method of manufacturing and the constitution of the reflective liquid crystal display device in a fourth embodiment are in common substantially with that in the second embodiment. The reflective liquid crystal display device has the same optical property as that shown in the sectional figure of the reflective liquid crystal device, FIG. 4 and FIG. 2.

The values of the reflective liquid crystal display device are set as follows. $\phi_{LCO}=-67.5°$, $\phi_{LC}=67.5°$, $\Omega_{LC}=45.0°$, $\phi hd F=157.5°$ and $\phi_P=112.5°$.

When the optical property of the reflective liquid crystal display device with reflective mode was measured while $\Delta n_{LC} \cdot d_{LC}$ was changed so that $\Delta R = R_{Film} - \Delta n_{LC} \cdot d_{LC}$ satisfied $-0.10 \mu m$, it was confirmed that a reflective liquid crystal display device with normally black mode, which can express a black display in achromatic color with low reflectance and a white display in achromatic color with high reflectance when $\Delta n_{LC} \cdot d_{LC}$ is in the range of $0.35 \mu m$ to $0.50 \mu m$, was realized. That is, under the above-mentioned condition, a liquid crystal has enough birefringence difference to express a black display and a white display distinctly and coloring caused by the birefringence of the liquid crystal can be compensated.

When the birefringence difference, $\Delta R$, satisfies the range of $-0.20 \mu m$ to $0.00 \mu m$, and a voltage is applied to change a display from black to white, it was confirmed that the color of the display was changed in the range of achromatic color in practice. That is, when the birefringence difference, $\Delta R$, is in the range of $-0.20 \mu m$ to $0.00 \mu m$ and $\phi_F - \phi_{LC}$ is $90°\pm20°$, coloring caused by the birefringence of the liquid crystal layer can be prevented during the change of the display from white to black, especially when the display is black to which an on-voltage is applied. Accordingly, a reflective liquid crystal display device that expresses a black display in achromatic color with low reflectance and a white display in achromatic color with high reflectance, that is a high contrast, can be realized.

Next, the optical property of the reflective liquid crystal display device was measured while a twist angle of a liquid crystal, $\Omega_{LC}$, was changed. In the fourth embodiment of this invention, it was confirmed that the preferable property can be obtained when the twist angle is in the range of 0° to 90°. It was further confirmed that the more preferable property can be obtained when the twist angle of the liquid crystal is in the range of 30° to 60° and $\Delta n_{LC} \cdot d_{LC}$ is in the range of $0.35 \mu m$ to $0.45 \mu m$.

It was confirmed that when $R_{Film}$ satisfies the range of $0.20 \mu m$ to $0.40 \mu m$, the reflectance of black, when an on-voltage is applied, can be decreased well.

The values of the reflective liquid crystal display device are set as follows. $\Delta n_{LC} \cdot d_{LC} = 0.400$ μm, $R_{Film} = 0.280$ μm, $\phi_{LCO} = -67.5°$, $\phi_{LC} = 67.5°$, $\Omega_{LC} = 45.0°$, $\phi_F = 145.5°$, and $\phi_P = 102.0°$. Under the above-mentioned condition, the optical property of the reflective crystal display device was measured. It was confirmed that $\Delta R = R_{Film} - \Delta n_{LC} \cdot d_{LC} = -0.120$ μm, $\phi_F - \phi_{LC} = 78.020$ and $\phi_P - \phi_F = -43.5°$, that is, the above-mentioned condition was satisfied.

The property of the front surface of the reflective liquid crystal display device was measured. The reflectance of white with Y value conversion was 16.1% and the contrast was 14.9. It was also confirmed that a 64 grade full-color display can be expressed since the color is changed from black to white in achromatic color.

Further, a reflective liquid crystal display device with a black and white mode was manufactured by removing a color filter layer 44 and the property of the front surface was measured. The contrast was 14.7 and the reflectance of white with Y value conversion was 32.1%.

Further, it was confirmed that the same effect can be obtained by using, for example, polyalylate or polysulfone as a polymer film, although polycarbonate was used in the present invention.

Further, it was confirmed that the same effect can be obtained by using a mtal electrode comprising silver, although the metal reflective electrode comprising aluminum was used in the present invention.

(A Fifth Embodiment)

A method of manufacturing and the constitution of reflective liquid crystal display device in a fifth embodiment are in common substantially with those in the first embodiment. The reflective liquid crystal display device has the same optical property as that shown in the sectional figure of the reflective liquid crystal device, FIG. 1 and FIG. 2.

Figure 6:
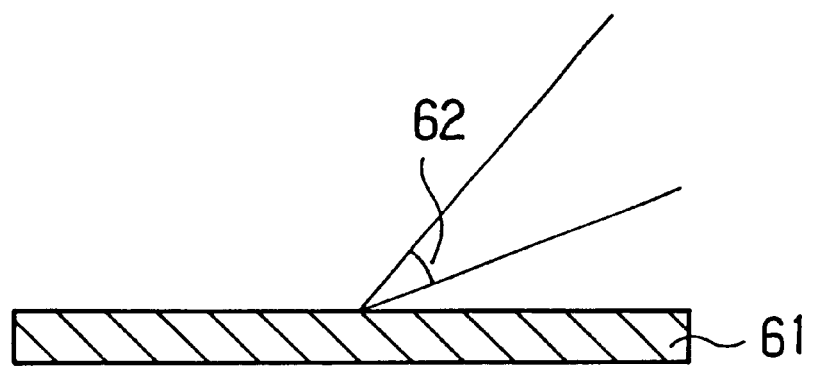
FIG. 6 is a conceptual and sectional view showing the forward light scattering film to explain the light scattering range.
Figure 7:
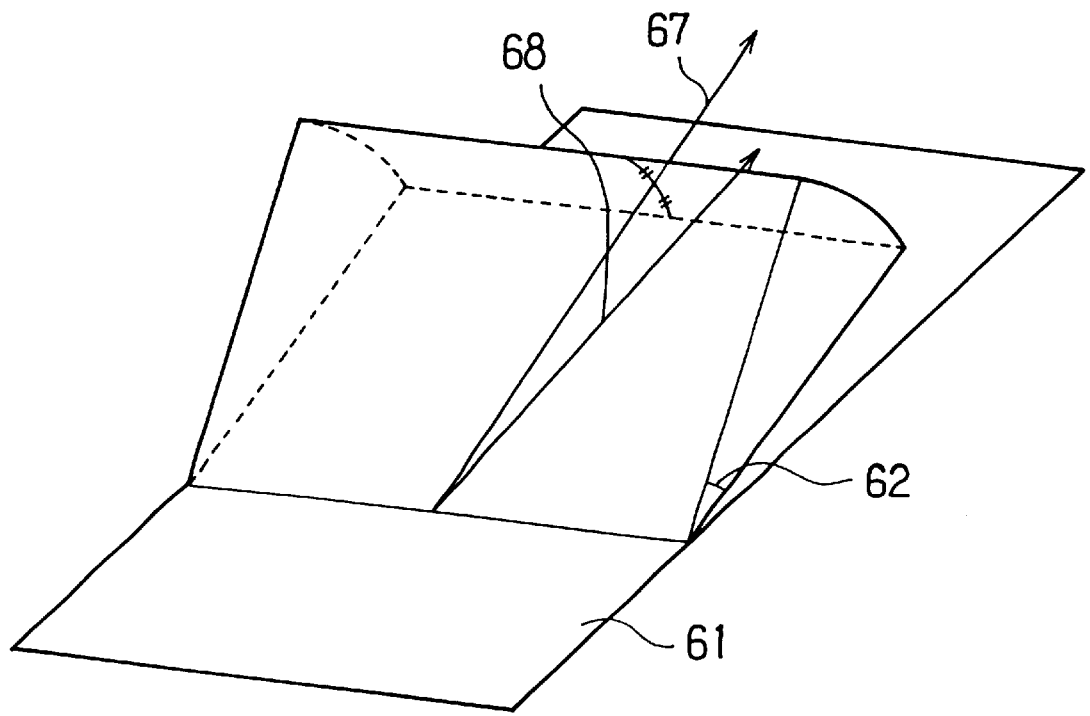
FIG. 7 is a conceptual and perspective view showing the forward light scattering film to explain the light scattering range and the light scattering direction.

FIG. 6 is a conceptual view showing the light scattering range of a forward light scattering film used preferably in this invention, seen from the sectional direction. FIG. 7 is a perspective view showing a forward light scattering film 61 to show the light scattering range 62. As above-mentioned, a factor determined by projecting a bisector of the light scattering range 67 on the surface of the light scattering film is set as the light scattering direction of the film 68.

The film has a high light scattering property in the light scattering range 62 and a low light scattering property out of the light scattering range 62. More concretely, it is preferable that in the light scattering range 62, the haze ratio is 60% or higher and more preferable that the haze ratio is 80% or higher. Further, out of the light scattering range 62, it is preferable that the haze ratio is 20% or lower. The above-mentioned film looks opaque when viewed from an angle in the light scattering range 62 and looks transparent when viewed from an angle out in the light scattering range 62. The haze ratio is shown by the following formula; (scattering light transmissivity)/(total light transmissivity)× 100 [%].

Figure 8:
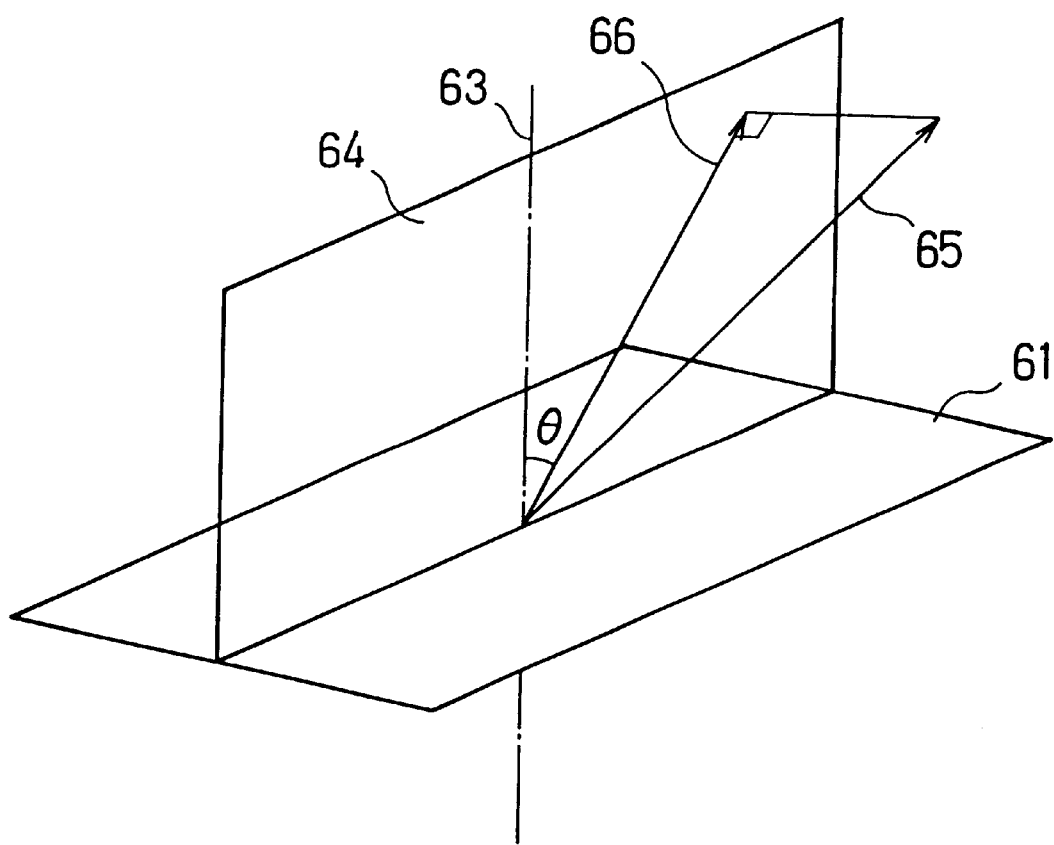
FIG. 8 is a conceptual and perspective view showing the forward light scattering film to explain a method for determining the light scattering range.

As shown in FIG. 8, the light scattering range 62 is set by an angle θ ($-90° \leq \theta \leq 90°$) between the normal 63 of the determined by projecting the incident light direction 65 on the surface of the predetermined plane surface 64 containing the normal of the film 63.

In this embodiment, the values of the reflective liquid crystal display device are set as follows. $\Delta n_{LC} \cdot d_{LC} = 0.400$ μm, $R_{Film} = 0.340$ μm, $\phi_{LCO} = -67.5°$, $\phi_{LC} = 67.5°$, $\Omega_{LC} = 45°$, $\phi_F = 155.0°$, and $\phi_P = 76.5°$.

Figure 9A:
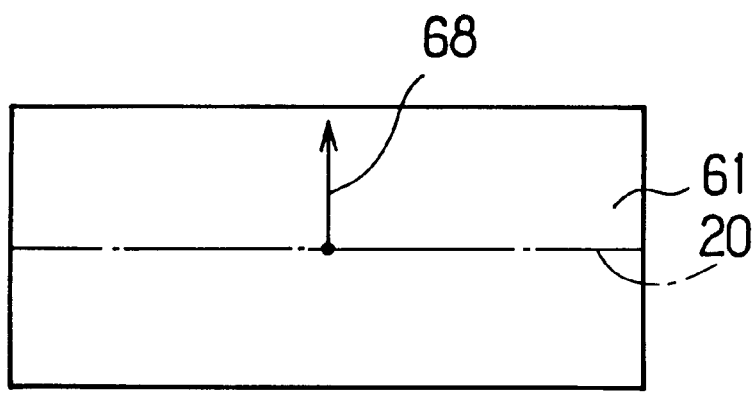
FIG. 9A is a conceptual and plan view showing a method for layering one forward light scattering film.

In the first embodiment, as shown in FIG. 9A, a forward light scattering film manufactured by SUMITOMO CHEMICAL CO., Ltd. used as a light scattering film layer 12 (Lumisty; the light scattering range $0° \leq \theta \leq 50°$) was adhered to the surface of the transparent substrate 13, so that the light scattering direction of the film 68 and a base line 20 have an orthogonal angle.

According to the above-mentioned construction, a reflective liquid crystal display device having a high light-collective efficiency and a property that changes slightly based on a change of a visual angle can be obtained. However, in this embodiment, the construction in which a plurality of forward light scattering films manufactured by SUMITOMO CHEMICAL CO., Ltd. (Lumisty) are used as a light scattering film layer 12 was examined.

Figure 9B:
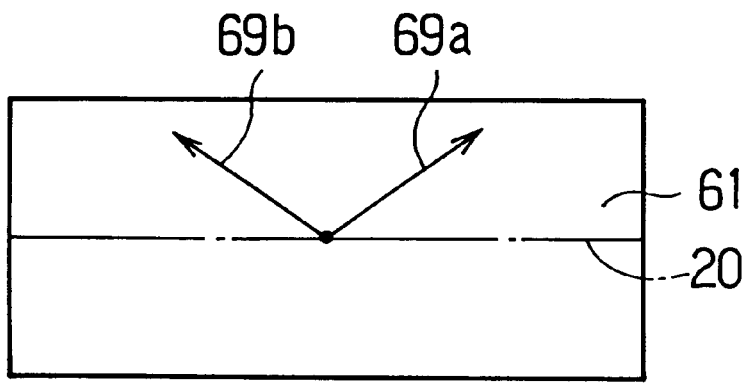
FIG. 9B is a conceptual and plan view showing a method for layering two forward light scattering films.

In the construction in which two light scattering films are used as shown in FIG. 9B, a first film having the light scattering range of $5° \leq \theta \leq 55°$ was adhered to a second film having the light scattering range of $0° \leq \theta \leq 60°$, so that the light scattering direction 69a of the first film and the light scattering direction 69b of the second film define an orthogonal angle.

Figure 9C:
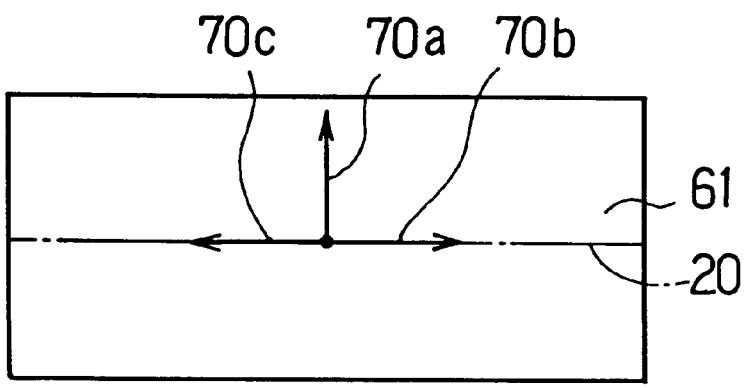
FIG. 9C is a conceptual and plan view showing a method for layering three forward light scattering films.

In the construction in which three light scattering films are used as shown in FIG. 9C, the first film having the light scattering range of $5° \leq \theta \leq 55°$ was adhered to two second films having the light scattering range of $10° \leq \theta \leq 60°$, so that and the light scattering direction 70a and the light scattering directions 70b and 70c have an orthogonal direction, respectively. In addition to that the scattering directions 70b and 70c have an anti-parallel direction.

According to, the constitution in which a plurality of light scattering films are used in this embodiment, the light-collective efficiency becomes high, a change of the visual property caused by a change of a visual angle becomes small and the visual property becomes natural.

In this embodiment, two or three forward light scattering films were used, however, in the constitution in which more than four forward light scattering films can be used, it is preferable that the forward light scattering films are layered so that all of the forward light scattering films have different light scattering directions. Particularly, in the constitution in which two, three or four forward light scattering films are used, preferable effects can be obtained by adhering films so that light scattering directions of the films have an orthogonal angle or have an anti-parallel direction.

(A Sixth Embodiment)

A method of manufacturing and the constitution of reflective liquid crystal display device in a sixth embodiment are in common substantially with those in the first embodiment. The reflective liquid crystal display device has the same optical property as that shown in the sectional figure of the reflective liquid crystal device, FIG. 1 and FIG. 2.

Figure 10A:
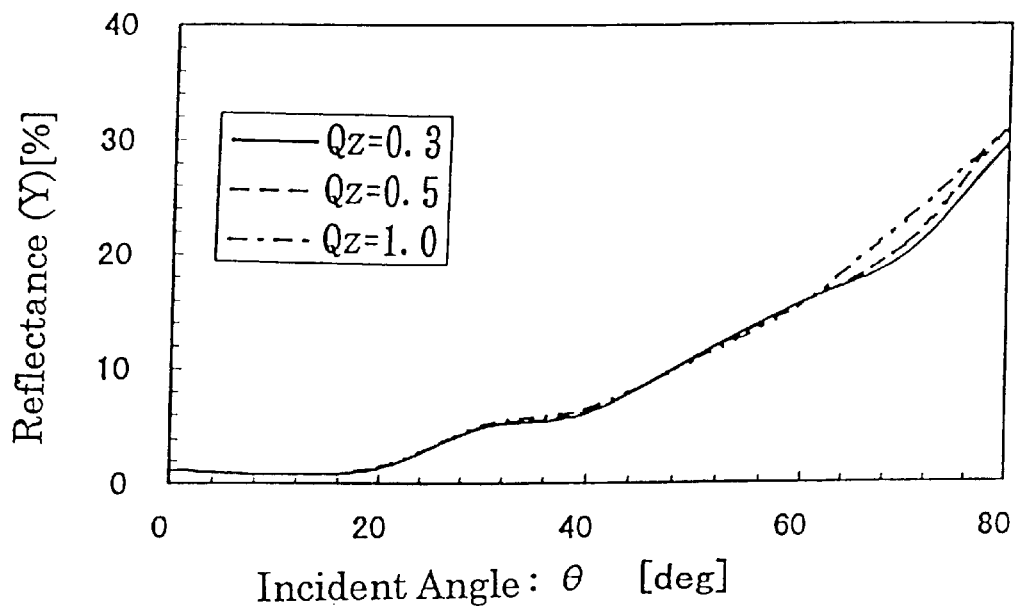
FIG. 10A shows a change of the reflectance of black caused by a change of a visual angle in the right direction when an on-voltage is applied.
Figure 10B:
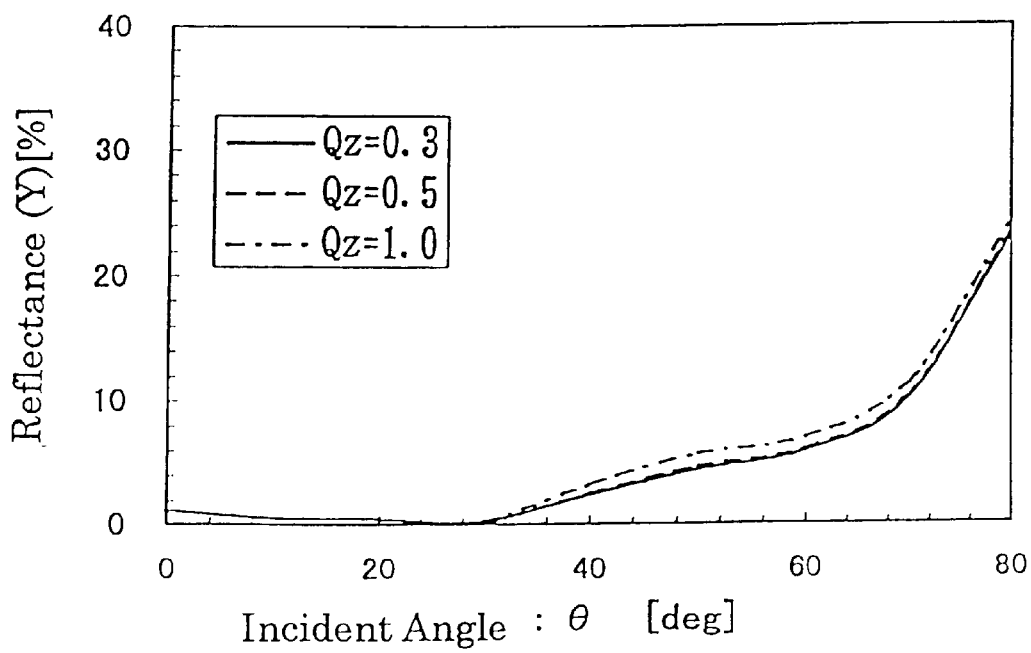
FIG. 10B shows a change of the reflectance of black caused by a change of visual angle in the upper direction when an on-voltage is applied.

FIG. 10A shows a change of the reflectance of black with respect to a visual angle viewed from the right direction in FIG. 2 when an on-voltage is applied. FIG. 10B shows a change of the reflectance of black with respect to a visual angle viewed from the upper direction in FIG. 2 when an on-voltage is applied. In FIGS. 10A and 10B, the incident angle is an angle between the direction of the incident light and the direction of normal of the panel.

In the embodiment, the values of the reflective liquid crystal display device are set as follows. $\Delta n_{LC} \cdot d_{LC} = 0.400$ μm, $R_{Film} = 0.340$ μm, $\phi_{LCO} = -67.5°$, $\phi_{LC} = 67.5°$, $\Omega_{LC} = 45°$, $\phi_F = 155.0°$, and $\phi_P = 76.5°$. A change of the visual property caused by a change of a visual angle was examined while the coefficient of Z, Qz of polymer film 11, was changed from 0.5 to 1.5.

As shown in FIGS. 10A and 10B, it was confirmed that the change of the visual property caused by a change of a visual angle was influenced by the polymer film 11. It was confirmed that when Qz is small, the reflectance of black changes slightly based on a change of a visual angle. That is, it was confirmed that a reflective liquid crystal display device which has the property which changes slightly based on a change of a visual angle is obtained when Qz satisfies the range of 0.0 to 1.0. Further, it was confirmed that a more preferable visual property based on a change of a visual angle is obtained when Qz satisfies the range of 0.2 to 0.6.

(A Seventh Embodiment)

Figure 11:
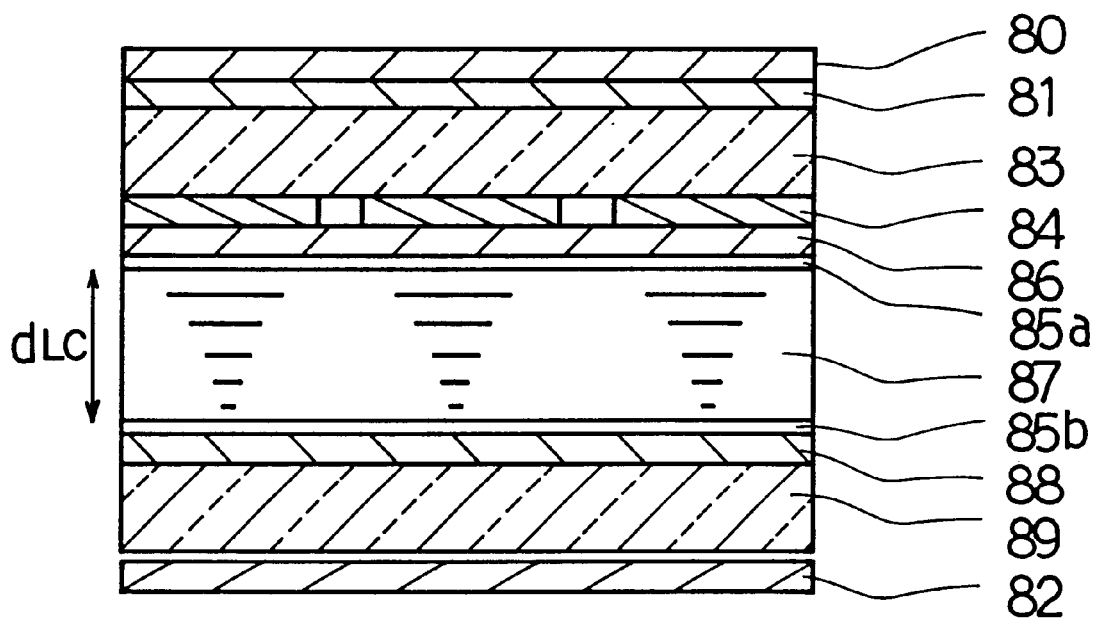
FIG. 11 is a sectional view showing another example of the reflective liquid crystal display device of the present invention.

FIG. 11 is a sectional view showing a reflective liquid crystal display device in a seventh embodiment of the present invention. In FIG. 11, numeral 80 represents a polarization film, numeral 81 represents a polymer film, numeral 83 represents a transparent substrate positioned at the upper side, numeral 84 represents a color filter layer, numeral 85a and 85b represent resin an alignment layer, numeral 86 represents a transparent electrode, numeral 87 represents a liquid crystal layer, numeral 88 represents a transparent electrode, numeral 89 represents a transparent substrate positioned at the lower side and numeral 82 represents a diffusing reflector.

A figure illustrating the optical property of the reflective liquid crystal display device in the seventh embodiment of the present invention is same as FIG. 2.

A non-alkali glass substrate (for example, 1737: manufactured by Corning Co., Ltd.) was used as a transparent substrate 83 and a transparent substrate 89. A pigment dispersion color filter layer 84 with stripe-array of red, green and blue was provided by photolithography on the transparent substrate 83.

Transparent electrodes 86 and 88 composed of an oxide of indium and tin as a picture element electrode were provided on the surface of the color filter layer 84 and the transparent substrate 89 positioned at the lower side, respectively. 5 wt % polyimide solution (the solvent is γ-butyrolactone) was printed on the surface of the transparent electrode 86 and 88. Then the polyimide solution was hardened at 200° C. and alignment treatment was carried out by the rotation rubbing method using rayon cloth to obtain a predetermined twist angle. Accordingly, alignment layers 85a and 85b were provided on the transparent electrode 86 and 88, respectively.

Next, a thermo-setting seal resin containing 1.0 wt % of glass fiber having a predetermined diameter (for example, Struct Bond manufactured by Mitsui Toatsu Chemicals, Inc.) was printed on the periphery of the surface of the transparent substrate 83 positioned at the upper side and resin beads having a predetermined diameter were spread on the substrate 89 positioned at the lower side at a ratio of 100–200 pieces/mm². The transparent substrate 83 and the substrate 89 were adhered together, and then the thermo-setting seal resin was hardened at 150° C. Next, air in the cell container was evacuated. Then, the liquid crystal obtained by mixing a predetermined amount of chiral crystal with fluorine-containing ester based nematic liquid crystal layer having the birefringence $\Delta n_{LC}$=0.09 was filled in the cell container. Then, the filled portion of the cell container was sealed with ultraviolet ray hardening resin, and the ultraviolet ray hardening resin was hardened by irradiation with ultraviolet ray to manufacture a liquid crystal cell.

A polycarbonate as a polymer film 81 was adhered to the transparent substrate 83 positioned at the upper side of the liquid crystal cell which was manufactured by the above-mentioned procedure so as to obtain a predetermined angle of the retardation axis direction. Finally, a neutral gray polarization film (SQ-1852AP manufactured by SUMITOMO CHEMICAL CO., Ltd.) as a polarization film 80, to which anti-reflection (AR) treatment was applied, was adhered to a polymer film 10 so as to obtain a predetermined angle of the adsorption axis direction or the transmission axis direction.

A silver diffusing reflector was provided as a diffusing reflector 82 under the transparent substrate 89 positioned at the lower side.

In the embodiment, the values of the reflective liquid crystal display device are set as follows. $\Delta n_{LC} \cdot d_{LC}$=0.400 μm, $R_{Film}$=0.340 μm, $\phi_{LCO}$=−67.5°, $\phi_{LC}$=67.5°, $\Omega_{LC}$=45°, $\phi_F$=155.0°, and $\phi_P$=76.5°.

As above-mentioned, when the substrates positioned at the upper side and at the lower side were used as a transparent substrate and as a transparent electrode, and a diffusing reflector was provided under the transparent substrate positioned at the lower side, blurred image caused by the effect of the parallax was obtained, however, it was confirmed that a reflective liquid crystal display device having a natural change of visual property caused by a change of a visual angle was obtained.

The property of the front surface of the reflective liquid crystal display device was measured. The reflectance of white with Y value conversion was 15.3% and the contrast was 13.9.

Further, a reflective liquid crystal display device with a black and white mode was manufactured by removing a color filter layer 84 and the property of the front surface was measured. The reflectance of white with Y value conversion was 30.3% and the contrast was 13.7.

It was confirmed that when the diffusing reflector 82 is provided under the transparent substrate 89 positioned at the lower side, an air layer is provided between the diffusing reflector 82 and the transparent substrate 89 positioned at the lower side, without being bonded completely with the adhesive, a more natural visual property caused by a change of a visual angle can be obtained by the diffusion effect caused by the difference between the refractive index of resin, about 1.6 and the refractive index of air, 1.0.

Further, it was confirmed that the same effect can be obtained by using an aluminum diffusing reflector, although silver was used as a diffusing reflector in the present invention.

(A Eighth Embodiment)

Figure 12:
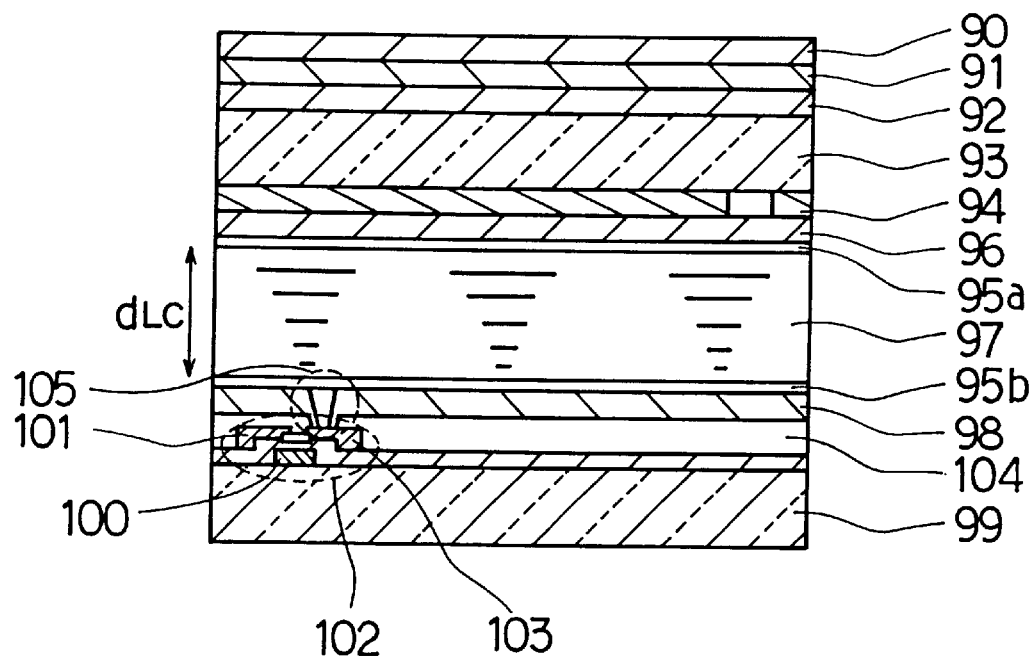
FIG. 12 is a sectional view showing another example of the reflective liquid crystal display device (active matrix type) of the present invention.

FIG. 12 is a sectional view showing a reflective liquid crystal display device in an eighth embodiment of the present invention. In FIG. 12, numeral 90 represents a polarization film, numeral 91 represents a polymer film, numeral 92 represents a light scattering film layer, numeral 93 represents a transparent substrate positioned at the upper side, numeral 94 represents a color filter layer, numeral 95a and 95b represent alignment layers, numeral 96 represents a transparent electrode, numeral 97 represents a liquid crystal layer, numeral 98 represents a metal reflective electrode, numeral 99 represents a substrate positioned at the lower side, numeral 100 represents a gate electrode, numeral 101 represents a source line, numeral 102 represents a thin film transistor element (TFT), numeral 103 represents a drain electrode, numeral 104 represents a film for flattening and numeral 105 represents a contact hole.

Unlike the first and third embodiments, in the eighth embodiment, the contact hole in the metal reflective electrode substrate provides an electrical contact with the non-linear switching element (TFT) provided under the film for flattening, so that the reflective liquid crystal display device in the eighth embodiment can be driven actively.

A figure illustrating the optical property of the reflective liquid crystal display device of the eighth embodiment of the present invention is the same as FIG. 2.

A non-alkali glass substrate (for example, 1737: manufactured by Corning Co., Ltd.) was used as a transparent substrate 93 and a transparent substrate 99. A pigment dispersion color filter layer 94 with stripe-array of red, green and blue was provided by photolithography on the transparent substrate 93. A transparent electrode 96 composed of an oxide of indium and tin as a picture element electrode were provided on the surface of the color filter layer 94 provided on the transparent substrate 93.

A gate electrode 100 composed of aluminum and tantalum, a source electrode 101 and a drain electrode 103 both composed of titanium and aluminum, were provided on the substrate 99 in a matrix. Thus, a TFT element 102 composed of amorphous silicon was provided at the periphery where the gate electrode 100 and the source electrode 101 cross each other.

On the surface of the substrate 99 on which the non-linear element was provided as above-mentioned, positive type photosensitive acrylic resin (for example, FVR manufactured by Fuji Chemical Industries Co., Ltd) was applied to form a film for flattening 104. After that, an ultraviolet ray was irradiated using a photo-mask with the film for flattening 104 and a contact hole 105 was provided on the drain electrode 103. Further, a titanium film having a thickness of 300 nm and an aluminum film having a thickness of 200 nm were deposited in that sequential order and a specular metal reflective electrode 98 was provided.

5 wt % polyimide solution (the solvent is γ-butyrolactone) was printed on the surface of the transparent electrode 96 and the metal reflective electrode 98. Then the polyimide solution was hardened at 200° C. and alignment treatment was carried out by the rotation rubbing method using rayon cloth to obtain a predetermined twist angle. Accordingly, alignment layers 95a and 95b were provided on the transparent electrode 96 and the metal reflective electrode 98, respectively.

Next, a thermo-setting seal resin containing 1.0 wt % of glass fiber having a predetermined diameter (for example, Struct Bond manufactured by Mitsui Toatsu Chemicals Inc.) was printed on the periphery of the surface of the transparent substrate 93 positioned at the upper side and resin beads having a predetermined diameter were spread on the substrate 99 positioned at the lower side at a ratio of 100–200 pieces/mm². The transparent substrate 93 and the substrate 99 were adhered together, and then the thermo-setting seal resin was hardened at 150° C. Next, air in the cell container was evacuated. Then, the liquid crystal obtained by mixing a predetermined amount of chiral crystal with fluorine-containing ester based nematic liquid crystal layer having the birefringence $\Delta n_{LC}$=0.09 was filled in the cell container. Then, the filled portion of the cell container was sealed with ultraviolet ray hardening resin, and the ultraviolet ray hardening resin was hardened by irradiation with ultraviolet ray to manufacture a liquid crystal cell.

A forward light scattering film manufactured by SUMITOMO CHEMICAL CO., Ltd. (Lumisty; the light scattering range $0° \leq \theta \leq 50°$) was used as a light scattering film layer 92 was adhered to the surface of the transparent substrate 93 of the liquid crystal cell, so that the light scattering direction and a base line 20 of the forward light scattering film have an orthogonal angle.

A polycarbonate as a polymer film 91 was adhered to the light scattering film layer 92 so that the retardation axis direction has a predetermined angle. Finally, a neutral gray polarization film (SQ-1852AP manufactured by SUMITOMO CHEMICAL CO., Ltd.) as a polarization film 90, to which anti-reflection (AR) treatment was applied, was adhered to the polymer film 91 so that an adsorption axis or a transmission axis has a predetermined angle.

In the embodiment, the values of the reflective liquid crystal display device are set as follows. $\Delta n_{LC} \cdot d_{LC}$=0.400 μm, $R_{Film}$=0.350 μm, $\phi_{LCO}$=-67.5°, $\phi_{LC}$=67.5°, $\Omega_{LC}$=45.0°, $\phi_F$=155.0°, and $\phi_P$=76.5°.

In this embodiment, the reflective liquid crystal display device having the constitution of the first embodiment was driven actively, and a 64 grade full-color display was obtained. The metal reflective electrode was provided on the film for flattening. Therefore the opening ratio of 97% was obtained. The property of the front surface of the reflective liquid crystal display device was measured. The reflectance of white with Y value conversion was 17.7% and the contrast was 15.6.

In all of the embodiments of this invention, a reflective liquid crystal display device with active drive can be obtained by providing a non-linear element such as TFT on the substrate at the lower side. Further, it was not limited to the amorphous silicon TFT as a non-linear element. The same effect can be obtained by using two-terminal element (MIM or thin film diode) or poly-silicon TFT.

This invention may be embodied in other specific forms without departing from the spirit or essential property thereof. The embodiments disclosed in this application are to be considered in all respects as illustrative and not restrictive, the scope of the invention being indicated by the appended claims rather than by the foregoing description, an all change which come within the meaning and range of equivalency of the claims are intended to be embraced therein.

What is claimed is:

1. A reflective liquid crystal display device comprising:

a) a liquid crystal cell including a first substrate, a second substrate and a nematic liquid crystal layer, the nematic liquid crystal layer being sealed between the first substrate and the second substrate, b) a polarization film provided at a first substrate side of the liquid crystal cell, c) a polymer film provided between the polarization film and the liquid crystal cell, and d) a light reflector provided at a second substrate side of the liquid crystal cell, wherein a twist angle of nematic liquid crystals in the nematic liquid crystal layer between the pair of the first and second substrates is set in the range of 0° to 90°, the product of the birefringence of the nematic liquid crystal layer $\Delta n_{LC}$ and the thickness of the liquid crystal layer $d_{LC}$, $\Delta n_{LC} \cdot d_{LC}$, is set in the range of 0.35 μm to 0.50 μm, the birefringence difference $\Delta R$ is in the range of -0.20 μm to 0.00 μm, wherein $\Delta R = R_{Film} - \Delta n_{LC} \cdot d_{LC}$ and $R_{Film}$ is a retardation of the polymer film, and when the reflective liquid crystal display device is seen from the first substrate side, the direction of the liquid crystal which is twisted from the first substrate side to the second substrate side is designated as the positive direction, $\phi_{LC}$ represents an angle between a base line set in the in-plane direction of the substrate and the longer axis direction of the liquid crystal molecule which is positioned most closely to the first substrate, $\phi_F$ represents an angle between the base line and a retardation axis direction of the polymer film, and $\phi_P$ represents an angle between the base line and an adsorption axis direction of the polarization film, $\phi_F - \phi_{LC}$ is in the range of 70° to 110° and $\phi_P - \phi_F$ is in the range of -90° to -60°.

2. The reflective liquid crystal display device according to claim 1, wherein the twist angle of nematic liquid crystals in the nematic crystal layer is in the range of 30° to 60°, and the $\Delta n_{LC} \cdot d_{LC}$ is in the range of 0.35 µm to 0.45 µm.

3. The reflective liquid crystal display device according to claim 1, wherein the $R_{Film}$ is in the range of 0.25 µm and 0.45 µm.

4. The reflective liquid crystal display device according to claim 1, wherein the polymer film includes at least one polymer selected from polycarbonate, polyalylate and polysulfone.

5. The reflective liquid crystal display device according to claim 1, wherein $Q_Z$ is a coefficient of Z of the polymer film, is in the range of 0.0 to 1.0 and is obtained by the formula; $Q_Z=(n_x-n_z)/(n_x-n_y)$, wherein $n_x$ represents a refraction index of X axis, which is the retardation axis direction (the extraordinary index of refraction), $n_y$ represents the refraction index of Y axis, which is the procession axis direction (the ordinary index of refraction) and Z axis represents a normal direction of the film surface of the spatial axis of direction (x, y, z).

6. The reflective liquid crystal display device according to claim 5, wherein the $Q_Z$ is set in the range of 0.2 to 0.6.

7. The reflective liquid crystal display device according to claim 1, further comprising a light scattering film provided on the first substrate side.

8. The reflective liquid crystal display device according to claim 7, wherein the light scattering film is a forward light scattering film.

9. The reflective liquid crystal display device according to claim 8, wherein the forward light scattering film has the light scattering range set by θ(−90°≦θ≦90°), wherein θ is an angle between a factor determined by projecting an incident light on the flat surface containing a normal of the film, and the normal of the film, and the light scattering range is asymmetric with respect to the normal direction of the film.

10. The reflective liquid crystal display device according to claim 9, wherein at least two light forward scattering films are layered so that factors determined by projecting a bisector of the light scattering range on the surface of the forward light scattering film do not have same direction.

11. The reflective liquid crystal display device according to claim 1, wherein the light reflector is a metal electrode, and the metal electrode includes at least one metal selected from aluminum and silver.

12. The reflective liquid crystal display device according to claim 11, wherein the metal electrode has a specular surface.

13. The reflective liquid crystal display device according to claim 11, wherein a light scattering film is provided on the metal electrode.

14. The reflective liquid crystal display device according to claim 11, wherein the metal electrode has an uneven surface, wherein the average incline angle of the surface is in the range of 3° to 12°, whereby the incident light is reflected on the metal electrode with diffusion.

15. The reflective liquid crystal display device according to claim 1, wherein the second substrate is a transparent substrate and the light reflector is provided outside of the transparent substrate.

16. The reflective liquid crystal display device according to claim 15, wherein an air layer is provided between the transparent substrate and the light reflector.

17. The reflective liquid crystal display device according to claim 1, wherein a color filter is provided at the first substrate side.

18. The reflective liquid crystal display device according to claim 1, wherein a non-linear element is provided at the second substrate side.

19. The reflective liquid crystal display device according to claim 18, wherein an insulating film for flattening is formed on the non-linear element and a contact hole provided in the insulating film provides an electrical contact between the non-linear element and an electrode provided on the second substrate side.

20. A reflective liquid crystal display device comprising:
   a) liquid crystal cell including a first substrate, a second substrate and a nematic liquid crystal layer, the nematic liquid crystal layer being sealed between the first substrate and the second substrate,
   b) a polarization film provided at a first substrate side of the liquid crystal cell,
   c) a polymer film provided between the polarization film and the liquid crystal cell, and
   d) a light reflector provided at a second substrate side of the liquid crystal cell,
   wherein a twist angle of nematic liquid crystals in the nematic liquid crystal layer between a pair of the first and second substrates is set in the range of 0° to 90°, the product of the birefringence of the nematic liquid crystal layer $\Delta n_{LC}$ and the thickness of the liquid crystal layer $d_{LC}$, $\Delta n_{LC} \cdot d_{LC}$, is set in the range of 0.35 µm to 0.50 µm, the birefringence difference $\Delta R$ is in the range of −0.20 µm to 0.00 µm, wherein $\Delta R = R_{Film} - \Delta n_{LC} \cdot d_{LC}$ and $R_{Film}$ is a retardation of the polymer film, and
   when the reflective liquid crystal display device is seen from the first substrate side, the direction of the liquid crystal which is twisted from the first substrate side to the second substrate side is designated as the positive direction, $\phi_{LC}$ represents an angle between a base line which is set in-plane direction of the substrate and the longer axis direction of a liquid crystal molecule which is positioned most closely to the first substrate, $\phi_F$ represents an angle between the base line and the retardation axis direction of the polymer film, and $\phi_P$ represents an angle between the base line and the adsorption axis direction of the polarization film, $\phi_F - \phi_{LC}$ is in the range of 70° to 110° and $\phi_P - \phi_F$ is in the range of −55° to −25°.

21. The reflective liquid crystal display device according to claim 20, wherein the twist angle of nematic liquid crystals in the nematic crystal layer is in the range of 30° to 60°, and the $\Delta n_{LC} \cdot d_{LC}$ is in the range of 0.35 µm to 0.45 µm.

22. The reflective liquid crystal display device according to claim 20, wherein the $R_{Film}$ is in the range of 0.20 µm and 0.40 µm.

23. The reflective liquid crystal display device according to claim 20, wherein the polymer film includes at least one polymer selected from polycarbonate, polyalylate and polysulfone.

24. The reflective liquid crystal display device according to claim 20, wherein $Q_Z$ is a coefficient of Z of the polymer film, is in the range of 0.0 to 1.0 and is obtained by the formula; $Q_Z=(n_x-n_z)/(n_x-n_y)$, wherein $n_x$ represents a refraction index of X axis, which is the retardation axis direction (the extraordinary index of refraction), $n_y$ represents a refraction index of Y axis, if which is the procession axis direction (the ordinary index of refraction) and Z axis represents a normal direction of the film surface of the spatial axis of direction (x, y, z).

25. The reflective liquid crystal display device according to claim 24, wherein the $Q_Z$ is set in the range of 0.2 to 0.6.

26. The reflective liquid crystal display device according to claim 20, further comprising a light scattering film provided at the first substrate side.

27. The reflective liquid crystal display device according to claim 26, wherein the light scattering film is a forward light scattering film.

28. The reflective liquid crystal display device according to claim 27, wherein the forward light scattering film has the light scattering range set by $\theta(-90°\leq\theta\leq 90°)$, wherein $\theta$ is an angle between a factor determined by projecting an incident light on the flat surface containing a normal of the film, and the normal of the film, and the light scattering range is asymmetric with respect to the normal direction of the film.

29. The reflective liquid crystal display device according to claim 28, wherein at least two light forward scattering films are layered so that factors determined by projecting a bisector of the light scattering range on the surface of the forward light scattering film do not have same direction.

30. The reflective liquid crystal display device according to claim 20, wherein the light reflector is a metal electrode, and the metal electrode includes at least one metal selected from aluminum and silver.

31. The reflective liquid crystal display device according to claim 30, wherein the metal electrode has a specular surface.

32. The reflective liquid crystal display device according to claim 30, wherein a light scattering film is provided on the metal electrode.

33. The reflective liquid crystal display device according to claim 30, wherein the metal electrode has an uneven surface, wherein the average incline angle of the surface is in the range of 3° to 12°, whereby incident light is reflected on the metal electrode with diffusion.

34. The reflective liquid crystal display device according to claim 20, wherein the second substrate is a transparent substrate and the light reflector is provided outside of the transparent substrate.

35. The reflective liquid crystal display device according to claim 34, wherein an air layer is provided between the transparent substrate and the light reflector.

36. The reflective liquid crystal display device according to claim 20, wherein a color filter is provided at the first substrate side.

37. The reflective liquid crystal display device according to claim 20, wherein a non-linear element is provided at the second substrate side.

38. The reflective liquid crystal display device according to claim 37, wherein an insulating film for flattening is formed on the non-linear element and a contact hole provided in the insulating film provides an electrical contact between the non-linear element and the electrode provided on the second substrate side.

* * * * *